(12) United States Patent
Sarnowski (10) Patent No.: US 9,527,424 B1
(45) Date of Patent: Dec. 27, 2016

(54) STRAP-RETAINER AND LOAD RETAINING SYSTEM USING SAME

(71) Applicant: Daniel Erik Sarnowski, Star Valley, AZ (US)

(72) Inventor: Daniel Erik Sarnowski, Star Valley, AZ (US)

( * ) Notice: Subject to any disclaimer, the term of this patent is extended or adjusted under 35 U.S.C. 154(b) by 104 days.

(21) Appl. No.: 14/694,007

(22) Filed: Apr. 23, 2015

(51) Int. Cl.
*B60P 7/08* (2006.01)

(52) U.S. Cl.
CPC ............ *B60P 7/0823* (2013.01); *B60P 7/083* (2013.01)

(58) Field of Classification Search
CPC ................................ B60P 7/0823; B60P 7/083
USPC ..... 410/96, 97, 100, 34, 50; 24/68 CD, 300, 24/301; 248/499
See application file for complete search history.

(56) References Cited

U.S. PATENT DOCUMENTS

| | | |
|---|---|---|
| 3,668,743 A | 6/1972 | Roberts |
| 3,931,656 A | 1/1976 | Thomson |
| 484,223 A | 6/1989 | Yonts |
| 5,383,259 A | 1/1995 | McIntire et al. |
| 5,402,557 A | 4/1995 | Dalen |
| 5,423,644 A | 6/1995 | First |
| 5,603,591 A | 2/1997 | McLellan |
| 5,623,750 A | 4/1997 | Marcotte, III et al. |
| 5,758,914 A | 6/1998 | Ioveno |
| 5,762,455 A * | 6/1998 | Long ............ B60P 7/0823 410/100 |
| 6,755,383 B2 | 6/2004 | Davis |
| 7,343,648 B2 | 3/2008 | Shaw |
| 7,571,521 B1 | 8/2009 | Backman, III |
| 7,922,052 B2 | 4/2011 | Pochschus et al. |
| 8,695,176 B2 | 4/2014 | Gangakhedkar et al. |
| 9,050,922 B1 * | 6/2015 | Taylor ............ B60P 7/083 410/100 |
| 2002/0138952 A1 | 10/2002 | Chou |
| 2006/0037178 A1 | 2/2006 | Sulhoff |
| 2009/0241300 A1 | 10/2009 | Ferguson |
| 2014/0007389 A1 | 1/2014 | Leung |
| 2014/0130308 A1 | 5/2014 | Haung |
| 2014/0150214 A1 | 6/2014 | Preston |
| 2014/0182084 A1 | 7/2014 | Hill |

* cited by examiner

*Primary Examiner* — Stephen Gordon
(74) *Attorney, Agent, or Firm* — Invention To Patent Services; Alex Hobson (57) ABSTRACT

A cargo retainer system incorporates a load-bearing strap that extends over a cargo element, and a strap-retainer having an elastic portion that is stretched to a stretched length and attached to the load-bearing strap. The strap-retainer has clamp that attaches to the load-bearing strap and a hook on an opposing end to secure the strap retainer under tension, or with the elastic portion stretched. The strap-retainer provides an elastic retaining force on the load-bearing strap wherein the force exerted on the load bearing strap increase when the cargo shift away from strap-retainer and the force decreases when the cargo shifts toward the strap-retainer. A cargo retainer system may incorporate a strap-retainer on either side of the cargo element to provide complimentary and corrective elastic retaining forces on the load-bearing strap.

20 Claims, 10 Drawing Sheets

STRAP-RETAINER AND LOAD RETAINING SYSTEM USING SAME

BACKGROUND OF THE INVENTION

Field of the Invention

The present invention relates to a strap-retainer and a cargo retaining system using said strap-retainer.

Background

Fabric straps are used to retain cargo as they have a high break strength, low elongation and can be ratcheted down to provide a large retention force to secure cargo in place. Fabric straps are not elastic in nature, however, and typically have low elongation before break and have little to no elastic behavior. Cargo secured by these types of straps can become unstable when jostled in such a way to create slack on one of the fixed ends of the strap. Cargo may tilt to the right, for example, and the right end of the strap between the fixed location and the cargo may become slack. As the strap becomes slack, it can dislodge from the fixed point and the cargo can be lost. This is a typical problem when securing cargo with straps wherein the straps are simply hooked to a support structure and when there may be large movement during transport of the cargo.

SUMMARY OF THE INVENTION

The invention is directed to a strap-retainer and a cargo retaining system employing at least one strap-retainer. An exemplary strap-retainer comprises a hook end, a clamp end and an elastic portion extending therebetween. The hook end comprises a hook for attachment to a support structure. The clamp end comprises a clamp that is configured to attach to a strap, such as a load-bearing strap. The elastic portion is configured to be stretched between a hook secured to a support and the clamp attached to a strap. The strap-retainer thereby provides a tension force on the strap and prevents slack from forming in the strap.

The hook comprises an attached end, an extended end and a curved portion. The curved portion may be configured around a support to retain the strap-retainer.

The clamp comprises a first clamp portion and a second clamp portion coupled together by a hinge. The two clamp portions may have a substantially planar body portion that are configured to align with each other, in plane, when the clamp is in a closed configuration. The first clamp portion comprises an aperture and the second clamp portion comprises a protrusion configured to extend at least partially into the aperture when the clamp is closed. A strap may be configured within the clamp with the length of the strap extending substantially perpendicular to the protrusion length. When the clamp is attached to a strap and closed down over the strap, the protrusion presses down on the strap to force it into a curved configuration within the aperture. This curved configuration of the strap, along with the friction and any force exerted by the protrusion and the walls of the aperture, retain the strap within the clamp. The protrusion is smaller in dimension than the aperture to enable the protrusion to extend at least partially into the aperture. In one embodiment, the protrusion extends completely through the aperture and beyond the outside surface of the first clamp portion. A clamp may comprise one protrusion/aperture feature or a plurality of protrusion/aperture features. A protrusion may be elongated having a length that is greater than the width of the protrusion. Many ratchet straps are about 5 cm or larger, about 7 cm or wider or about 10 cm or larger in width. A clamp may be configured to accommodate any suitable width strap and may have a width and protrusion length that is larger than the width of the strap it is attached to.

A clamp may comprise a retention feature, such as teeth or roughened surface configured along one or more inside surfaces of the first or second clamp portions. The teeth may be configured with the pointed ends directed toward the top end of the clamp, or away from the elastic portion, to prevent the strap from slipping within the clamp when retained and the elastic portion is stretched.

The elastic portion extends from the clamp end to the hook end and may comprise any suitable type of elastic material. An elastic portion is configured to substantially return to an original length after a force is removed. The original length of an elastic portion is the length with no force or tension applied thereon and may be any suitable length such as about 10 cm or more, about 20 cm or more, about 50 cm or more, about 100 cm or more and any length between and including the length values provided. An elastic portion may be stretched any suitable length and recover back to the original length. An elastic portion may be configured to stretch to a stretched length that is any percentage greater in length than the original length, such as about 10% or more, about 25% or more, about 35% of more, about 50% or more, about 100% or more, about 150% or more and any range between and including the percentages of increase in length from the original length.

An elastic portion may comprise a spring comprising a wound metal strand that may have a spring constant, rubber, elastomer, silicone, urethane, or any other material that has an elastic recovery properties. In an exemplary embodiment, an elastic portion can be stretched at least 1.5 times an original length and substantially return to the original length, or at least 2.0 times the original length and substantially return to the original length. An elastic portion may provide an increasing resistive force with elongation and thereby more effectively provide a recovering force to a strap that is moved from the cargo that is jostled. An elastic portion may be circular, square or rectangular in cross-section along the length.

An exemplary cargo retainer system comprises a load-bearing strap and at least one strap-retainer, as described herein. A load-bearing strap assembly comprises a load-bearing strap, such as a woven fabric strap that is strong and has low elongation. A load-bearing strap may have less than 50% elongation before break and is substantially non-elastic; wherein it will not recover back to an original length after elongation of 25% or more, or of 50% or more for example. A load-bearing strap may comprise a woven material of natural or synthetic polymer, such as aliphatic or semi-aromatic polyamides, polyester, poly-aramid, composites and the like. A load bearing strap may be planar having a width that is much greater than the thickness. The width of a load bearing strap may be, about 2 cm or more, about 5 cm or more, about 10 cm or more and any range between and including the width values provided. The thickness of a load-bearing strap may be about 1 mm or more, about 2 mm or more about 4 mm or more and any range between and including the thickness values provided. A load-bearing strap assembly further comprises a ratcheting apparatus to increase the force of the strap configured over cargo. A ratchet apparatus as used herein may be an actual ratchet or a cam buckle that can be used to exert tension on the free end of the strap and then lock the strap under tension. At least one strap-retainer, as described herein, is attached to the load-bearing strap. The elastic portion is stretched and the hook is attached to a support. The elastic portion may be configured substantially parallel with the strap. In an exemplary embodiment, a strap-retainer is configured on either side of the cargo and attached to a load-bearing strap to provide tension to the strap on both opposing ends.

The strap-retainer and cargo retainer system may be used in an exemplary method to retain cargo in place and provide an elastic retaining force to a load-bearing strap configured to retain the cargo as it moves during transport. A load-bearing strap may be configured over a cargo element such as a piece of cargo or a transport implement, such as a skid, and secured to supports on either side. In an exemplary embodiment, the load-bearing strap is ratcheted down by a ratchet or through the application of tension on the free end of strap, in the case of a cam buckle, to increase the tension in the strap extending over the cargo. A first strap-retainer is then attached to the load-bearing strap between the cargo and the support. The clamp of the first strap-retainer is configured over the strap and closed to secure the strap within the clamp and specifically at least partially within the aperture of the clamp. The elastic portion is then stretched and secured to a support structure. In an exemplary method, a second strap-retainer is attached to the strap on the opposite side of the cargo from the first strap-retainer. Again, the elastic portion is stretched and the hook end is secured to a support. In an exemplary method, an elastic portion is stretched to a stretched length of at least 1.5 times the original length.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
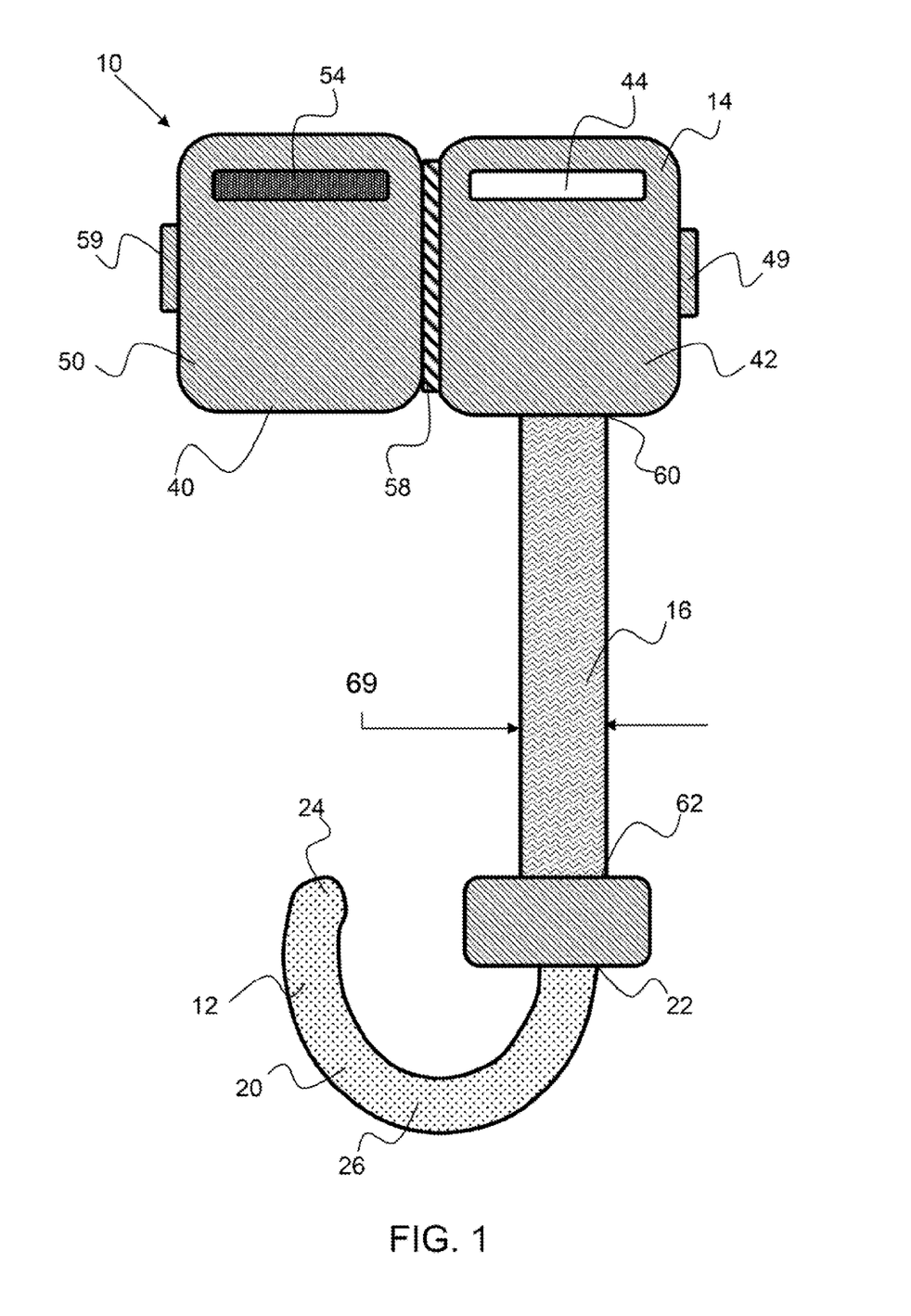
FIG. 1 shows an exemplary strap-retainer having a clamp end, a hook end and an elastic portion extending therebetween.

As shown in FIG. 1, an exemplary strap-retainer 10 has a clamp end 14, a hook end 12 and an elastic portion 16 extending therebetween. The clamp portion comprises a clamp 40 having a first clamp portion 42 and a second clamp portion 50. The exemplary first and second clamp portions are generally planar having a substantially planar inside surface and outside surface. The first and second clamp portions may generally be considered plates having a thickness that is much less than the length and/or width, such as less than one quarter the length or width. The first clamp portion comprises an aperture 44 and the second clamp portion comprises a protrusion 54 aligned with the aperture and configured to extend into the aperture when the clamp is in a closed configuration. The clamp portion 14 further comprises a latch 59 configured to retain the clamp in a closed configuration. The latch is configured to lock into a latch retainer 49 configured on the first clamp portion. A latch retainer may be a geometric portion of the first clamp portion. The elastic portion extends from a clamp-end 60 to a hook-end and has a width 69. The width may be considered the diameter when the elastic portion has a circular cross-section. The elastic portion may be planar however and have length, width and thickness. The hook end 12 comprises a hook 20 having an attached end 22, an extended end and a curved portion 26 that has about a 180 degree radius.

Figure 2A:
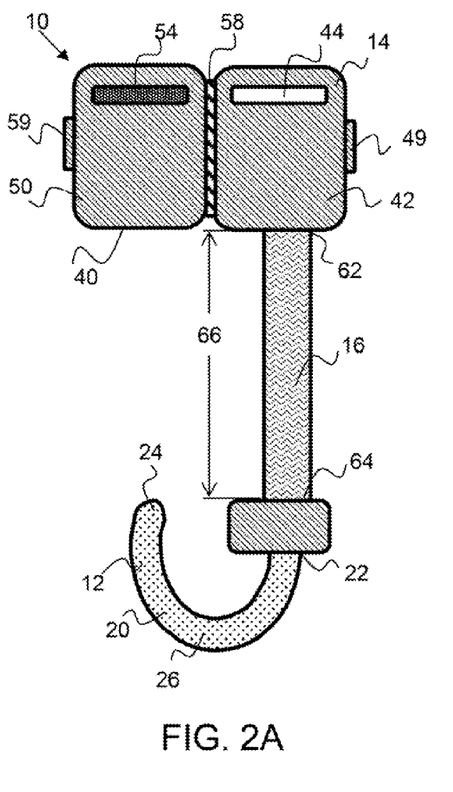
FIG. 2A shows an exemplary strap-retainer having an elastic portion having an original length.

As shown in FIG. 2A, an exemplary strap-retainer 10 has an elastic portion 16 configured with an original length 66. The original length may be a length of the elastic portion when no force is applied to the elastic portion.

Figure 2B:
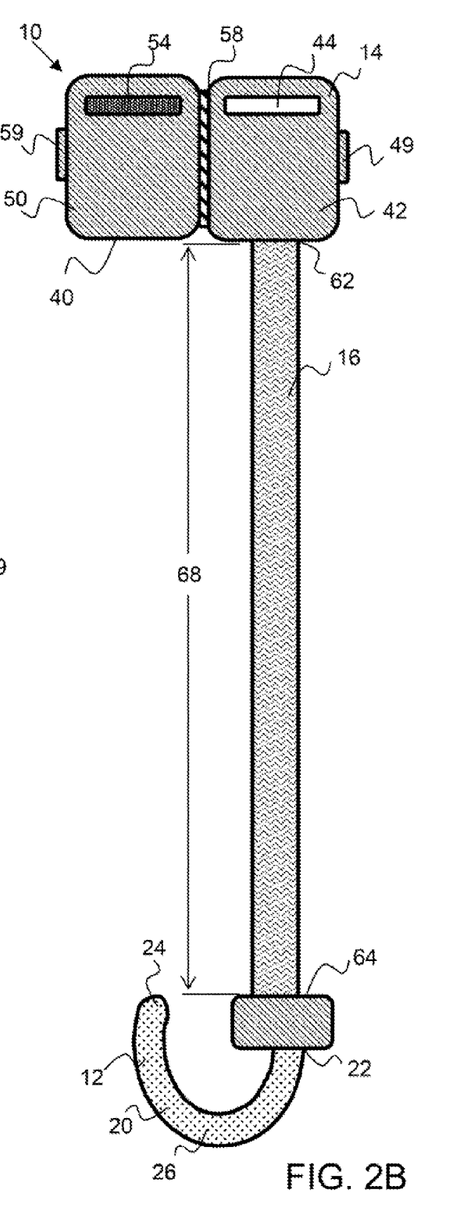
FIG. 2B shows the exemplary strap-retainer shown in FIG. 2A having an elastic portion stretched to a stretched length.

As shown in FIG. 2B an exemplary strap-retainer 10 has an elastic portion 16 configured with a stretched length 68. The stretched length may be the length of the elastic portion when a force, such as a tensile force, is applied strap-retainer, as indicated by the bold arrows. The strap-retainer is preferably stretched prior to engaging it with a strap, wherein the hook is retained by a support, the clamp is retained on a strap configured over cargo and the elastic portion is stretched to some degree. The stretched length may be any suitable percentage increase over the original length, such as about 10% or more, about 25% or more, about 50% or more, about 100% or more, about 150% or more and any range between and including the percentages of increase in length over the original length.

Figure 3:
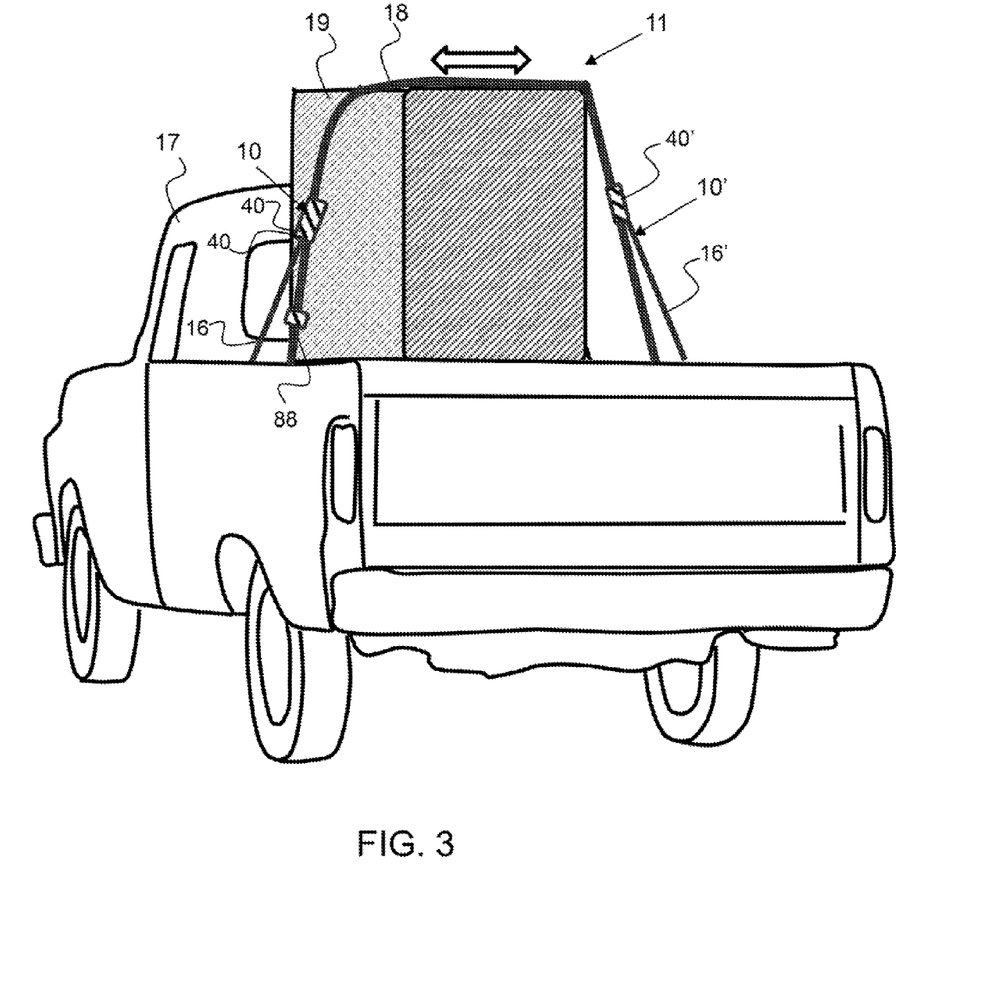
FIG. 3 shows an exemplary cargo retaining system utilizing an exemplary strap-retainer.

As shown in FIG. 3, an exemplary cargo retaining system 11 utilizes two exemplary strap-retainers 10, 10'. A first strap retainer 10 is configured on one side of the cargo element 19 and a second strap retainer 10' is configured on the opposing side of the cargo and both are affixed to the same load-bearing strap 18 that extends over the cargo and is under tension, as indicated by the double ended arrow above the cargo element 19. A cam buckle type ratchet apparatus 88 is coupled with the load-bearing strap to secure and retain the load-bearing strap under tension. The clamps 40, 40' are attached to the load-bearing strap and the elastic portion 16 extends therefrom and is retained to the vehicle 17. Each strap-retainer provides an elastic retaining force on the load-bearing strap to ensure that the strap remains in tension even when the cargo is jostled or tilts as the vehicle travels or moves. The force exerted by the strap-retainer on the load-bearing strap is an elastic retaining force as it will change with the elongation of the elastic portion of the strap-retainer. The elastic retaining force exerted by a strap-retainer may increase or decrease as the strap-retainer is elongated or shortened due to movement of cargo. The change is force may be linear or non-linear with increasing elongation. In this way, the strap-retainer exerts more force as the cargo is offset and the strap-retainer is elongated more. Likewise, a strap-retainer will exert less force on the load-bearing strap as the cargo shifts in a way to shorten the stretched elastic portion.

Figure 4A:
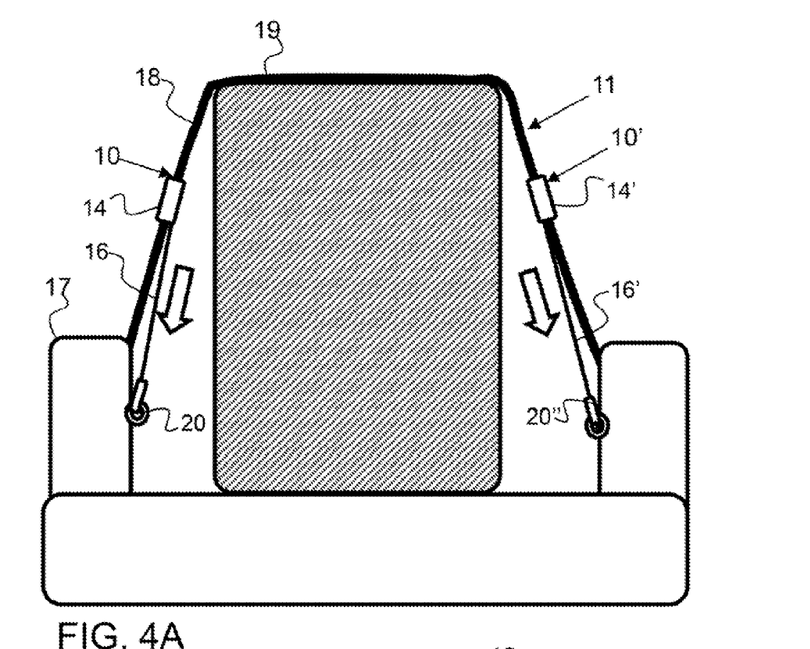
FIG. 4A shows an exemplary cargo retaining system utilizing an exemplary strap-retainer.

As shown in FIG. 4A, an exemplary cargo retaining system 11 utilizes two exemplary strap-retainers 10, 10'. The strap-retainers provide an elastic retaining force on the load-bearing strap 18 as indicated by the bold arrows. The elastic-portion of the strap-retainer is stretched to a stretched length and the hooks 20, 20' is attached to a support on the vehicle.

Figure 4B:
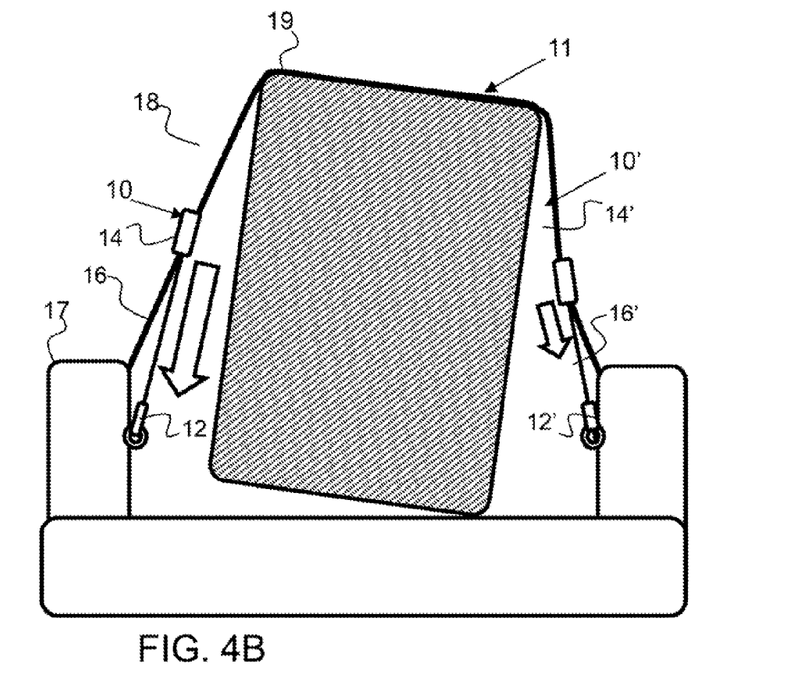
FIG. 4B shows the exemplary cargo retaining system of FIG. 4A with the cargo offset or tilted and the strap-retainer keeping tension on the strap.

As shown in FIG. 4B, the exemplary cargo retaining system 11 provides an elastic retaining force on the load-bearing strap 18 as it starts to tilt. The elastic retaining force of the first strap-retainer 10 increases as the cargo is displaced away from the first strap-retainer and elongates the elastic portion, as indicated by the larger arrow. The elastic retaining force of the second strap-retainer 10' decreases as the cargo is displaced toward the second strap-retainer and thereby shortens the length of the elastic portion, as indicated by the smaller arrow. The cargo retaining system 11 enables correction of cargo element 19 displacements and reduces the risk of a strap becoming disengaged with a connection to a support due to slack caused by cargo shifting.

Figure 10:
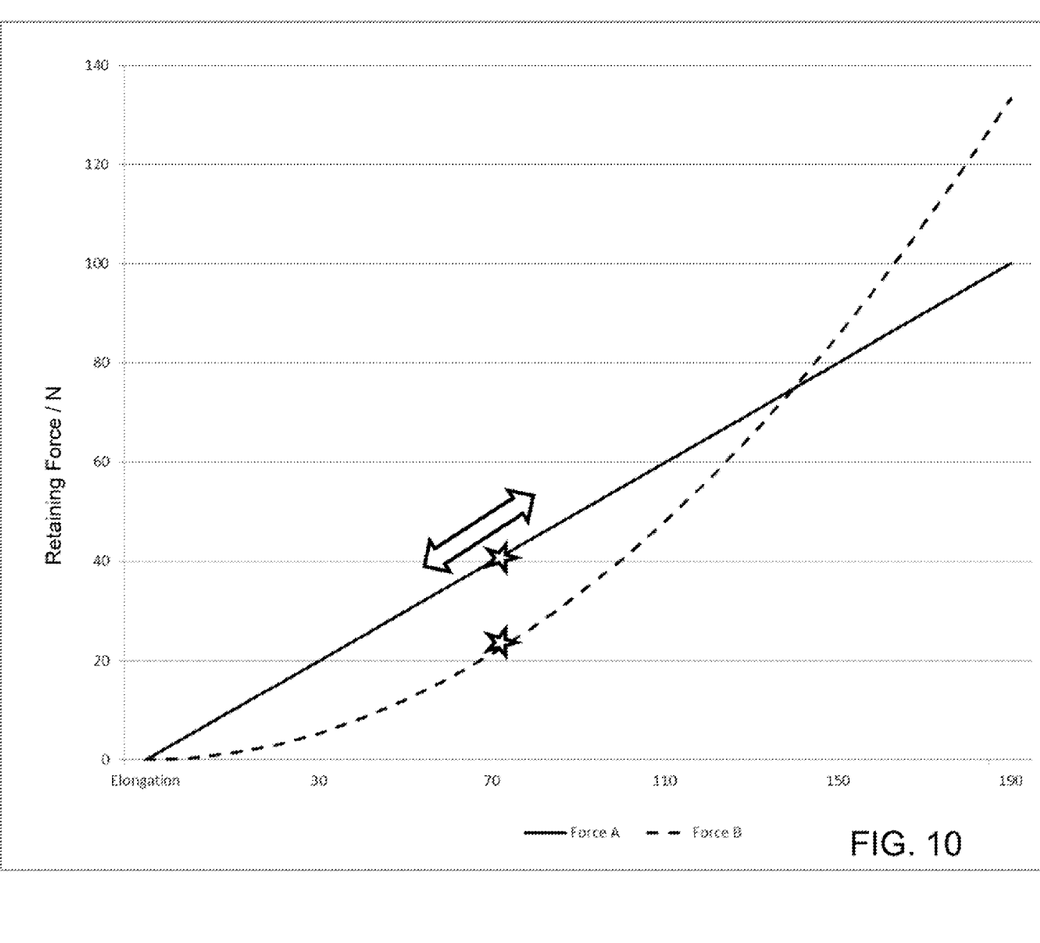
FIG. 10 shows a graph of elastic retaining force versus elongation of exemplary strap-retainers.

As shown in FIG. 10, the force exerted by a strap-retainer on a load-bearing strap, or elastic retaining force, may increase substantially linearly or in a non-linear manner with elongation of the elastic portion. The stars indicate an exemplary initial stretched length of the elastic portion of the strap-retainers. As shown on the Force A line, an approximately 70% elongation of the elastic portion results in an initial elastic retaining force of about 40 N. As shown on the Force B line, an approximately 70% elongation of the elastic portion results in an initial elastic retaining force of about 25 N. Force A is a linear force and the slope of the line may be a spring constant, wherein the elastic retaining force changes linearly with a change in length of the elastic portion. Force B is a non-linear force wherein the elastic retaining force changes non-linearly with a change in length of the elastic portion. The change in elastic retaining force versus elongation may be substantially exponential.

Figure 5:
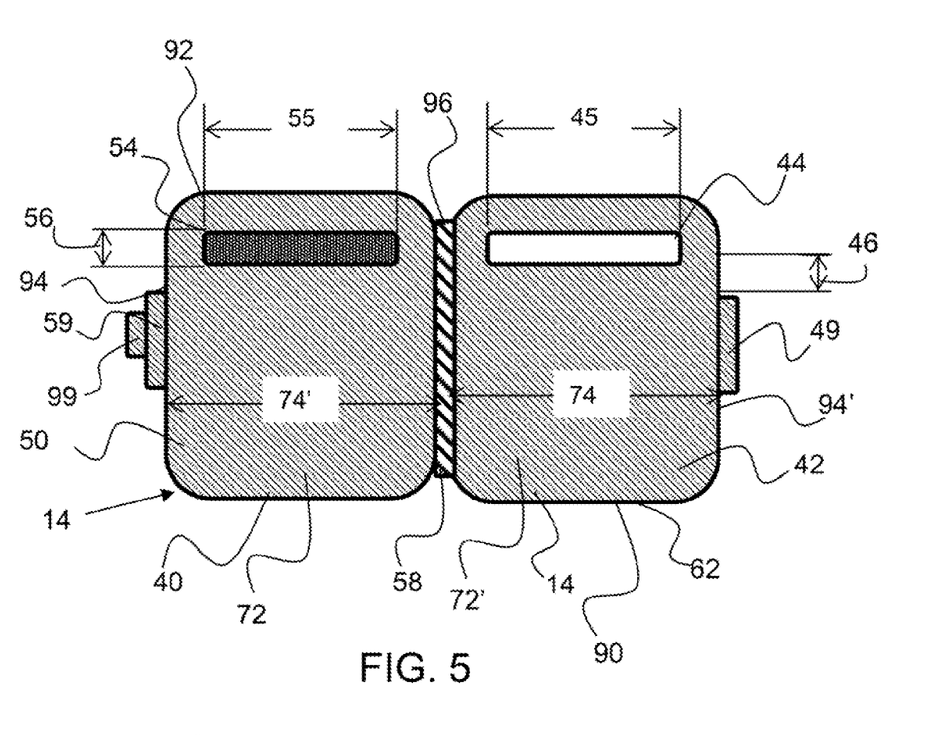
FIG. 5 shows a top-down view of an exemplary clamp having a aperture and a protrusion configured for insertion into the aperture when the clamp is closed.

As shown in FIG. 5, an exemplary clamp 40 has a first clamp portion 42 and a second clamp potion 50. Both clamp portions have a planar body portions 72, or plates, that are configured to align, in plane with each other, when the clamp is closed. The first clamp portion 42 and the second clamp portion have a width 74 and 74', respectively. The first clamp portion 42 comprises an aperture 44 and the second clamp portion 50 comprises a protrusion 54 configured for insertion into the aperture when the clamp is closed. The protrusion 54 has a length 55 and a width 56 that are less than the aperture length 45 and width 44, respectively, to enable the protrusion to extend at least partially into the aperture. The protrusion and aperture are elongated, having an aspect ratio of length to width of about 2.0 or more and preferably about 3.0 or more. The protrusion and aperture are configured more proximal to the top end 92 of the clamp 40 than the bottom end 90. It is to be understood that the protrusion and aperture may be configured centrally or more proximal to the bottom of the clamp. As described herein, the length of the protrusion and aperture may be about 2.0 cm or more, about 5.0 cm or more, about 7 cm or more and about 10 cm or more, for example. A latch 59 is shown on a side 94 of the clamp, or the outer protrusion side, and a latch retainer 49 is shown on a side 94', or outer aperture side of the clamp. The latch may comprise a lock 99 that can be used to secure the latch to the latch retainer and prevent the clamp from opening. The protrusion and clamp both have a hinge side 96 where the two components are coupled together by the hinge.

Figure 6:
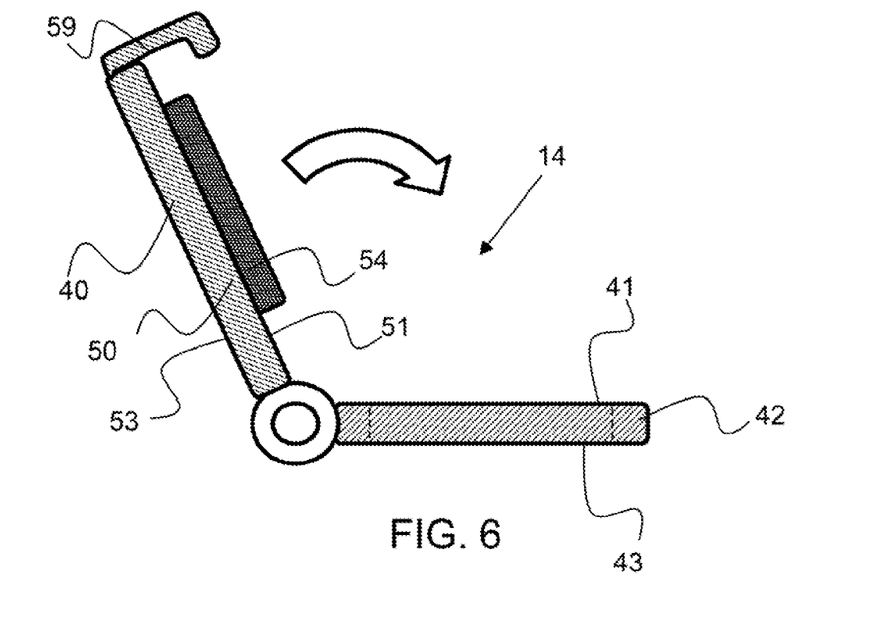
FIG. 6 shows an end view of an exemplary clamp having a protrusion extending from the inside surface of the second clamp portion.

As shown in FIG. 6, an exemplary clamp 40 has a protrusion 54 extending from the inside surface 51 of the second clamp portion 50. The clamp is configured to close, wherein the inside surface 51 of the second clamp portion is rotated toward the inside surface 41 of the first clamp portion 42. The protrusion may extend through the aperture and past the outside surface 43 of the first clamp portion. The second clamp portion 50 has an outside surface 53 that is substantially planar in this embodiment.

Figure 7:
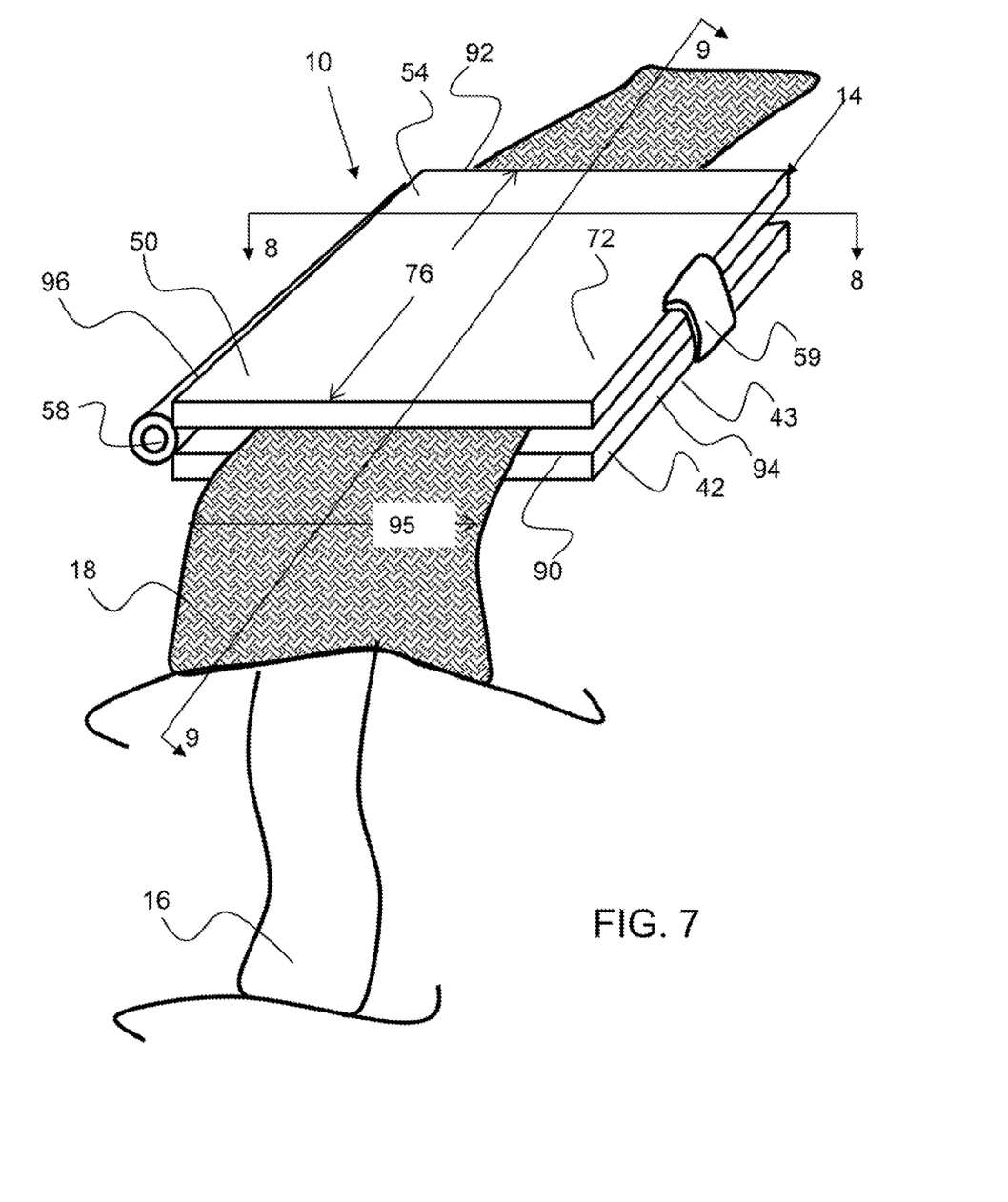
FIG. 7 shows a perspective view of an exemplary strap-retainer in a closed configuration with a strap extending therethrough and retained by the strap-retainer.

As shown in FIG. 7, an exemplary strap-retainer 10 is in a closed configuration with a load-bearing strap 18 extending therethrough and retained by the strap-retainer. The strap has a width 95 that is less than the length of the aperture to enable the strap to conform into the aperture for retention therein. The latch 59 is shown locked to the outside surface 43 of the first clamp portion 42. The length 76 of the second clamp portion's planar body portion is shown.

Figure 8:
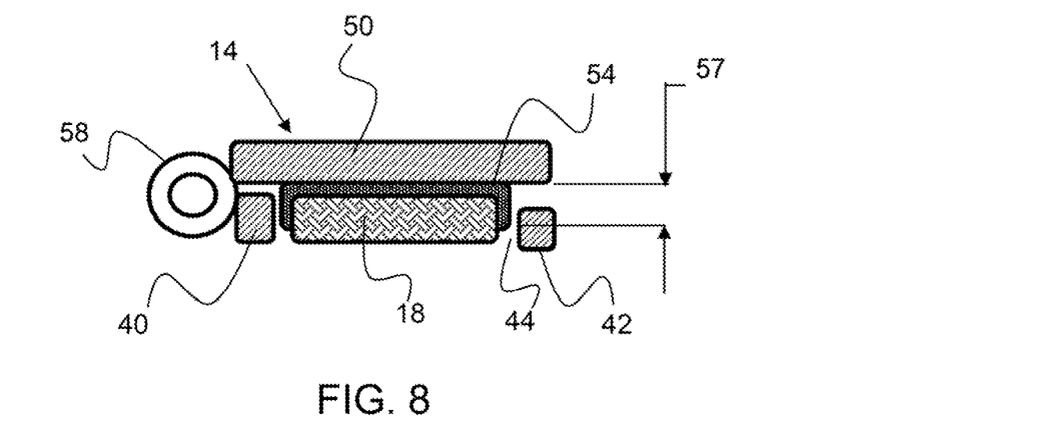
FIG. 8 shows a cross-section view along line 8 of the exemplary clamp shown in FIG. 7 in a closed configuration with the protrusion extending into the aperture to retain a strap.

As shown in FIG. 8, an exemplary clamp 40 is in a closed configuration with the protrusion 54 extending into the aperture 44 to retain a strap 18. The protrusion has a height 57 that extends into the aperture 44 and may be any suitable dimension, such as about 0.5 cm or more, about 1.0 cm or more, about 2.0 cm or more, about 4 cm or more and the like. The protrusion may extend past the outer surface of the first clamp portion 42. The load-bearing strap bends around the extended end of the protrusion and this tortuous path, and force exerted by the protrusion on the strap, secures the strap within the clamp.

Figure 9:
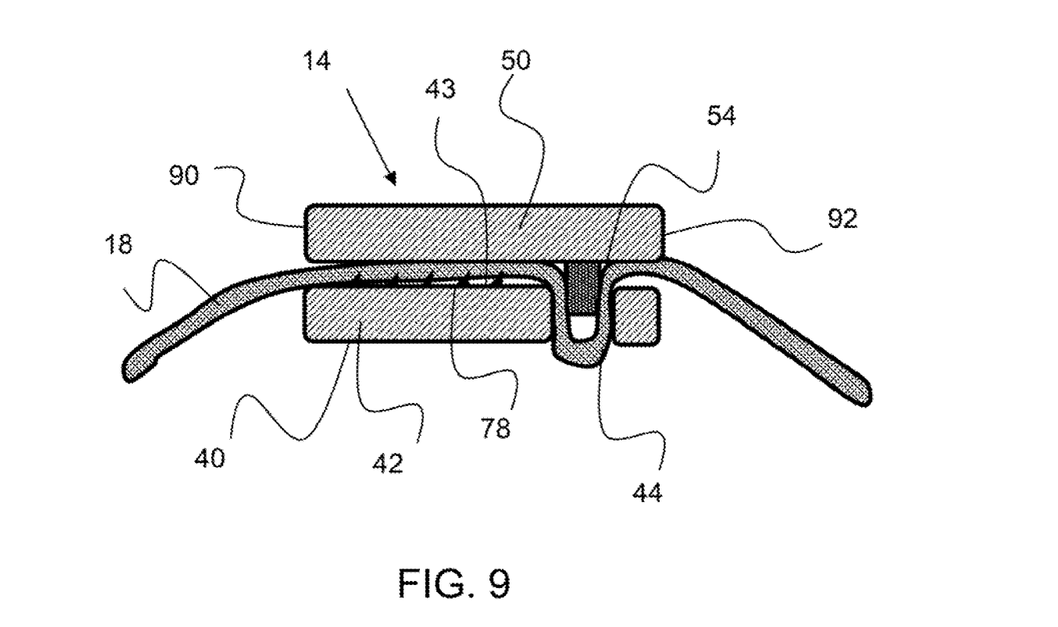
FIG. 9 shows a cross-section view along line 9 of the exemplary clamp FIG. 7 in a closed configuration with the protrusion extending into the aperture to retain a strap.

As shown in FIG. 9, an exemplary clamp 40 is in a closed configuration with the protrusion 54 extending into the aperture 44 to retain a strap 18. The strap bends around the extended end of the protrusion and is pinched between the protrusion and the walls of the aperture. This bent orientation of the strap, along with the friction force exerted by the protrusion and in some cases the inside walls of the aperture, retain the strap within the clamp. Additional retention features 78 are configured on the inside surface of the first clamp portion 42 and engage with the strap 18 when the clamp is in a closed configuration to further prevent the strap from slipping or moving.

Figure 11A:
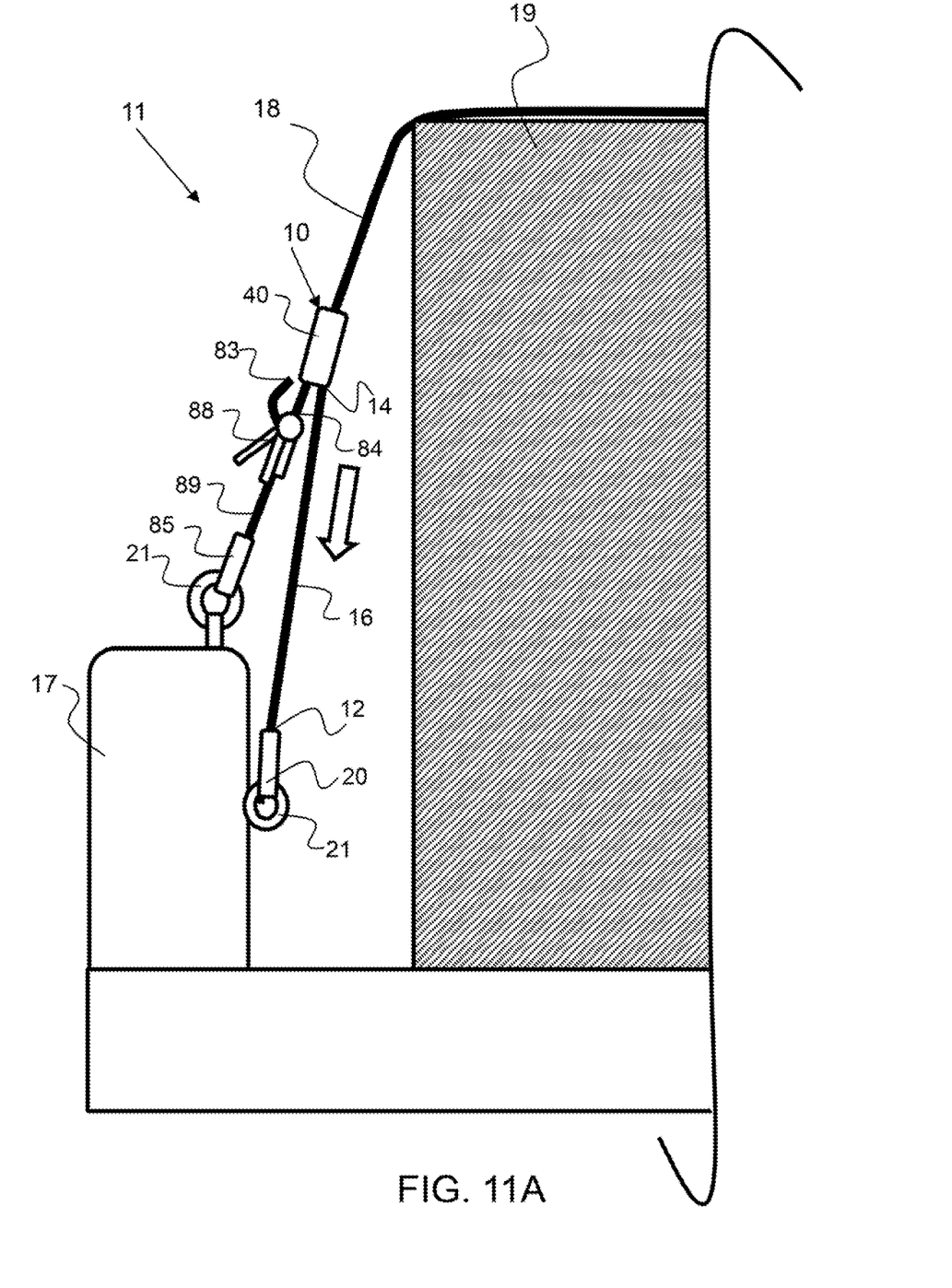
FIG. 11A shows a ratchet apparatus side of an exemplary cargo retaining system.

As shown in FIG. 11A, an exemplary cargo retaining system 11 comprises a load-bearing strap assembly 80 that comprises a load-bearing strap 18 that extends over cargo to a ratchet-end 84 where it is coupled with the ratchet apparatus 88. In most cases, a load-bearing strap will loop through a ratchet apparatus, such as a ratchet or cam buckle, leaving a free end 83 extending from the ratchet apparatus. In this exemplary embodiment, the ratchet apparatus is a ratchet having a lever to pull and tighten the load-bearing strap down over the cargo element 19. The ratchet increases the tension in the load-bearing strap and secures the strap under tension. A second load-bearing strap, or ratchet strap 89 extends from the ratchet apparatus to a ratchet-end hook 85 that is attached to a support 21. The strap-retainer 10 is attached to the load-bearing strap 18 above the ratchet apparatus 88 by the clamp 40. The elastic portion 16 extends from the clamp to the hook 20, which is attached to a support 21. It is to be understood that that the strap-retainer may be clamped to the load-bearing ratchet strap in some cases.

Figure 11B:
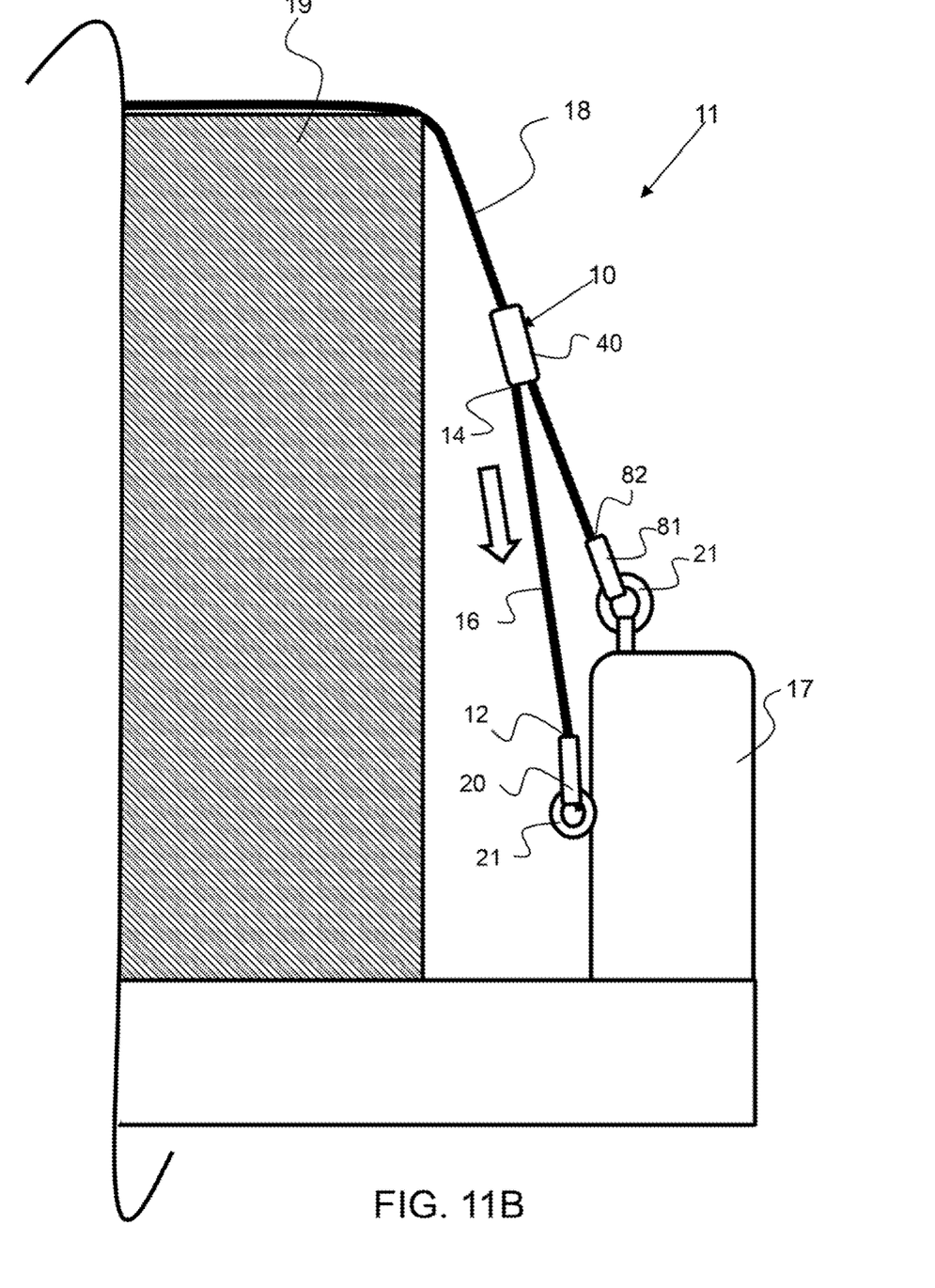
FIG. 11B shows a hook-end side of an exemplary cargo retaining system.

As shown in FIG. 11B, an exemplary cargo retaining system 11 comprises a load-bearing strap assembly 80 that comprises a load-bearing strap 18 that extends to a hook-end 82, where it is coupled with the extended end-hook 81. The extended end-hook is attached to support 21. A second strap-retainer 10 is attached to the load-bearing strap 18 by the clamp 40. The elastic portion 16 extends from the clamp to the hook 20, which is attached to a support 21.

A load-bearing strap, as described herein, is a strap that has high strength and low elongation and is non-elastic, wherein the strap will not recover after being elongated more than 50% or in some case, more than 25% of an original length. A load-bearing strap may have less than 100% elongation before break and in most cases less than 50% elongation before break.

An elastic portion of a strap-retainer will have elastic recover when elongated 50% of an original length, and in some cases when elongated more than 100% an original length.

A hook, as used herein includes any hook implement that may be used to attach an end of a strap-retainer or load-bearing strap to a support and includes, but is not limited to, s-hooks, j-hooks, d-rings, snap hooks, flat hook, carabineer and the like. In an exemplary embodiment, a hook has an attached end, an extended end and a curved portion therebetween that brings the extended end back toward the attached end.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A strap-retainer comprising:
   a. a hook end comprising a hook;
   b. a clamp end comprising a clamp comprising:
      i. a first clamp portion having an aperture;
      ii. a second clamp portion having a protrusion;
      iii. a hinge configured between and coupling the first and second clamp portions together;
      wherein the protrusion of the second clamp portion is configured to extend at least partially through the aperture of the first clamp portion when the clamp is in a closed configuration;
   c. an elastic portion extending between the hook end and the clamp end,
      wherein the elastic portion is elastic in a length direction, whereby the elastic portion is configured to stretch from an original length to a stretched length and recover substantially back to said original length,
      whereby in use, with the strap-retainer clamped to a load-bearing strap, with said load-bearing strap extending through the clamp in a closed configuration to retain the strap-retainer to the load-bearing strap, with the hook end coupled to a support and with the elastic portion stretched to a stretched length, the strap-retainer provides an elastic retaining force on said load-bearing strap.

2. The strap-retainer of claim 1, wherein the elastic portion comprises rubber.

3. The strap-retainer of claim 1, wherein the elastic portion is configured to extend at least 100% of the original length and recover substantially back to said original length.

4. The strap-retainer of claim 1, wherein the first clamp portion has a substantially first planar body portion, and wherein the second clamp portion has a substantially second planar body portion that is configured to align substantially parallel with the first planar body portion when the clamp is in a closed configuration.

5. The strap-retainer of claim 4, wherein the aperture in the first clamp portion extends in a cross-length direction across the first planar body portion.

6. The strap-retainer of claim 1, wherein the clamp comprises a latch to hold the clamp in a closed configuration.

7. The strap-retainer of claim 1, wherein the clamp comprises a lock to retain the clamp in a closed configuration.

8. The strap-retainer of claim 1, wherein the protrusion has a height that is configured to extend completely through the aperture and past an outside surface of the first clamp portion when the clamp is in a closed configuration.

9. A cargo retainer system comprising:
a. a load-bearing strap assembly comprising:
  i. a load-bearing strap extending from a hook-end comprising an extended-end hook to a ratchet apparatus;
  ii. a ratchet-strap extending from the ratchet apparatus to a ratchet-end hook;
  wherein the ratchet apparatus is configured to pull and retain the load-bearing strap from the hook-end to the ratchet apparatus;
b. a first strap-retainer comprising:
  i. a hook end comprising a hook;
  ii. a clamp end comprising a clamp comprising:
    a first clamp portion having an aperture;
    a second clamp portion having a protrusion;
    a hinge configured between and coupling the first and second clamp portions together;
  wherein the protrusion of the second clamp portion is configured to extend at least partially through the aperture of the first clamp portion when the clamp is in a closed configuration;
  iii. an elastic portion extending between the hook end and the clamp end,
  wherein the elastic portion is elastic in a length direction, whereby the elastic portion can be stretched from an original length to a stretched length and recover substantially back to said original length,
  whereby in use, with the load-bearing strap extending over a cargo element and the extended-end hook coupled to a support on a first side of the cargo element and the ratchet-end hook coupled with a support on a second and opposing side to said first side of the cargo element, and
  with the clamp of the strap-retainer clamped to the load-bearing strap and said load-bearing strap extending through the clamp in a closed configuration to retain the strap-retainer to the load-bearing strap, with the hook of the strap retainer coupled to a support and with the elastic portion stretched to the stretched length, the strap-retainer provides an elastic retaining force on said load-bearing strap.

10. The cargo retainer system of claim 9, comprising a second strap-retainer;
wherein the first strap-retainer is clamped to the load-bearing strap the first side of the cargo element with the elastic portion of the first strap-retainer stretched to the stretched length; and
wherein the second strap-retainer is clamped to said load-bearing strap on a second and opposing side to said first side of the cargo element with an elastic portion of the second strap-retainer stretched to a stretched length.

11. The cargo retainer system of claim 10, wherein the stretched length of both the first and second elastic portions is at least 20% greater than a respective original length.

12. The cargo retainer system of claim 9, wherein the ratchet apparatus comprises a ratchet.

13. The cargo retainer system of claim 9, wherein the elastic portion is configured to extend at least 100% of the original length and recover substantially back to said original length.

14. The cargo retainer system of claim 9, wherein the stretched length is at least 20% greater than the original length.

15. The cargo retainer system of claim 9, wherein the protrusion has a height that is configured to extend completely through the aperture and past an outside surface of the first clamp portion when the clamp is in a closed configuration.

16. A method of retaining a cargo element comprising the steps of:
a. providing a cargo retainer system comprising:
  i. a load-bearing strap assembly comprising:
    a load-bearing strap extending from a hook-end comprising
    an extended-end hook to a ratchet apparatus;
    a ratchet-strap extending from the ratchet apparatus to a ratchet-end hook;
  wherein the ratchet apparatus is configured to pull and retain the load-bearing strap from the hook-end to the ratchet apparatus;
  ii. a first strap-retainer comprising:
    a hook end comprising a hook;
    a clamp end comprising a clamp comprising:
      a first clamp portion having an aperture:
      a second clamp portion having a protrusion;
      a hinge configured between and coupling the first and second clamp portions together;
  wherein the protrusion of the second clamp portion is configured to extend at least partially through the aperture of the first clamp portion when the clamp is in a closed configuration;
    an elastic portion extending between the hook end and the clamp end,
  wherein the elastic portion is elastic in a length direction, whereby the elastic portion can be stretched from an original length to a stretched length and recover substantially back to said original length,
b. attaching the extended-end hook of the load-bearing strap to a support on a first side of a cargo element;
c. extending the load-bearing strap over said cargo element;
d. attaching the ratchet-end hook to a support on a second and opposing side to said first side of said cargo element;
e. tightening the load-bearing strap between the extended-end hook and the ratchet apparatus to produce a tension in the load-bearing strap and securing the load-bearing strap under said tension with the ratchet apparatus;
f. attaching the first strap-retainer to the load-bearing strap by clamping the clamp around a portion of the load-bearing strap, wherein the load-bearing strap extends through the clamp;
g. extending the elastic portion of the first strap-retainer to a stretched length and attaching the hook of the first strap-retainer to a support;
  whereby in use, the first strap-retainer provides an elastic retaining force on said load-bearing strap when the cargo element shifts during transport.

17. The method of retaining a cargo element of claim 16, further comprising the steps of:
providing a second strap-retainer;
attaching the second strap-retainer to the load-bearing strap by clamping the clamp around a portion of the load-bearing strap, wherein the load-bearing strap extends through a clamp of the second strap-retainer;
extending an elastic portion of the second strap-retainer to a stretched length and attaching a hook of the second strap-retainer to a support;
whereby in use, the first and second strap-retainers provide an elastic retaining force on said load-bearing strap when the cargo element shifts during transport.

18. The method of retaining a cargo element of claim 17, wherein a stretched length of both the first strap-retainer and second strap-retainer elastic portions is at least 20% greater than respective original lengths.

19. The method of retaining a cargo element of claim 16, wherein the ratchet apparatus comprises a ratchet.

20. The method of retaining a cargo element of claim 16, wherein the protrusion has a height that is configured to extend completely through the aperture and past an outside surface of the first clamp portion when the clamp is in a closed position.

\* \* \* \* \*